Aug. 25, 1970    R. A. GROULX ET AL    3,525,625
FERMENTATION OF WORT
Filed Aug. 7, 1967
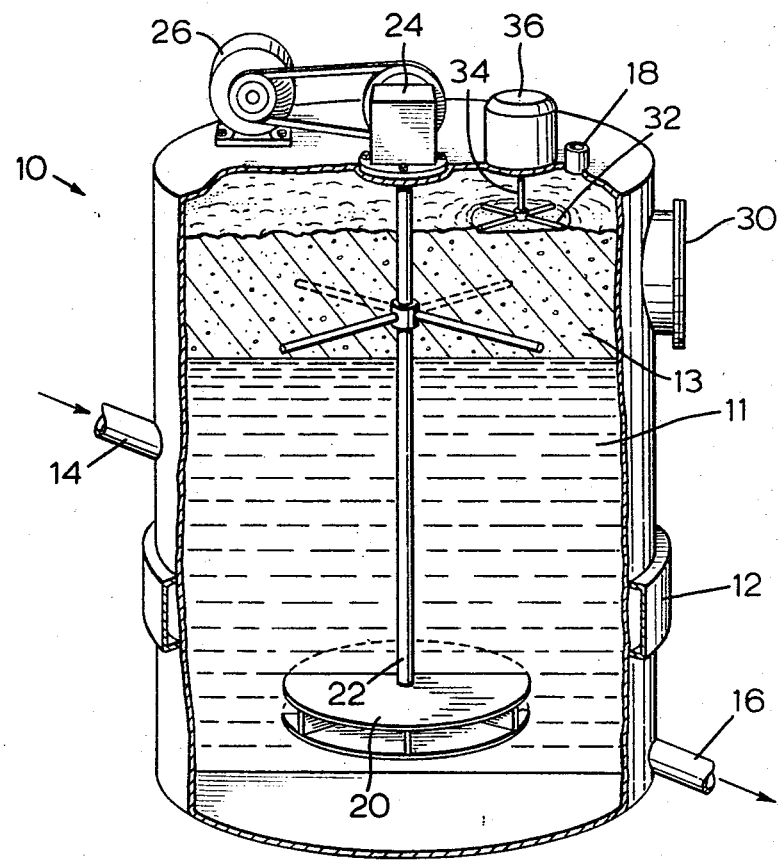
INVENTORS
ORLAND O. SHAUS
ROBERT A. GROULX
BY *Fetherstonhaugh & Co.*
ATTORNEYS

United States Patent Office 3,525,625
Patented Aug. 25, 1970

3,525,625
FERMENTATION OF WORT
Robert A. Groulx and Orland O. Schaus, Toronto, Ontario, Canada, assignors to Canadian Breweries Limited, Toronto, Ontario, Canada
Filed Aug. 7, 1967, Ser. No. 658,905
Claims priority, application Canada, Aug. 15, 1966, 967,853
Int. Cl. C12c *11/04*
U.S. Cl. 99—31                                6 Claims

ABSTRACT OF THE DISCLOSURE

This invention relates to the maintaining of a yeast cap on the top of a fermenter in the fermenting of beer, and involves the collapsing of the yeast cap over a small portion of its surface and venting the collapsed portion to permit the gas released by the collapsing of the yeast cap to rise freely. The yeast cap is collapsed by passing a revolving blade through it.

---

This invention relates to the fermentation of wort in the making of a potable alcoholic brewery beverage such as ale.

Various types of yeast are used in the making of alcoholic brewery beverages wherein a yeast fermentable substrate known as brewer's wort is fermented by the action of a yeast to give a potable beverage. The general process is very well known and description of the complete process is not included herein. Some yeasts are heavy and tend to sink to the bottom of the wort substrate. Others are light and tend to rise to the top of the substrate. These latter yeasts are called top fermenting yeasts and are commonly used in the manufacture of a type of alcoholic brewery beverage generally known as ale. This invention is concerned with the control of the size of the yeast cap.

Top fermenting yeasts tend to gather in a foam on the top of the fermenting wort is the fermentation process takes place in what is known in the brewing trade as a yeast cap. This cap often becomes quite deep and represents a substantial quantity of yeast that is not in active contact with the wort. It thus represents an inefficiency in the use of yeast in the process. In many cases, the cap becomes so large that the fermenting vessel overflows with a resulting loss of yeast content and admixed fermenting substrate. This latter condition is known as purging and is wasteful and undesirable. Purging is quite likely to be encountered where one attempts to use modern accelerated fermentation techniques which involve higher yeast concentrations, elevated temperatures, and agitation of the wort with a view to keeping the yeast in efficient contact therewith, not only with top fermenting yeasts but also with bottom fermenting yeasts where purging is encountered. While it is, of course, possible to avoid the occurrence of purging by running the fermenting vessel with a lower volume of wort to provide a greater free board area above the wort surface, this reduces the capacity of a fermenter. From this point of view, it is costly.

It is, therefore, an object of this invention to improve the efficiency of the fermentation process by achieving a more efficient contact of the yeast with the wort.

It is a further object of the invention to control the occurrence of purging in a fermentation process.

It is a still further object of the invention to increase the capacity at which a fermenter may be operated by maintaining the yeast cap at a small dimension.

Thus, the invention has application in the production of a potable brewery beverage wherein a yeast fermentable substrate in a fermenting vessel is pitched with a yeast and fermenting conditions are maintained which result in the vigorous formation of a yeast cap on the top of the fermenting substrate and consists essentially of an improved method of controlling the size of the yeast cap in a fermenting vessel, that comprises the steps of degassing and collapsing the yeast cap at the upper part of a portion of the yeast cap over a portion only of the surface of the substrate to prevent the yeast cap from enlarging to the top of the fermenting vessel and to maintain space between said portion of the yeast cap and the upper extremity of said fermenting vessel substantially free of foam by passing blade means through the yeast cap to permit gas released by degassing and collapsing said yeast cap to rise freely, whereby yeast contained in said collapsed yeast cap is released for reentry to said substrate. The invention will be clearly understood after reference to the following detailed specification read in conjunction with the drawing.

The drawing shows a fermenting vessel equipped to practice this invention.

The drawing shows a fermenter 10 having a height of about 57 inches and a diameter of about 48 inches. Its total capacity is about 500 gallons. It has a strap around jacket 12 which carries tubes for coolant and heating fluid for controlling the temperature of the substrate in the fermenter in use according to known practice. Wort is, in use, admitted to the fermenter through the inlet 14 and pumped from the fermenter after fermentation through the outlet 16. A vent 18 is provided on the top of the fermenter to vent gas from the fermenter, as will be referred to again later. A shrouded turbine type agitator 20 on the free end of shaft 22 extends into the fermenter to agitate wort during fermentation and maintain efficient contact between yeast and substrate according to known practice. Shaft 22 extends from gear box 24 on the top of the fermenter and gear box 24 in turn is connected with an electric motor 26 whereby, in use, operation of the motor 26 rotates the agitator 20 through gear box 24 and shaft 20. Numeral 30 refers to a manhole in the fermenter.

As indicated above, it is known practice to ferment a wort substrate 11 in such a fermenter and to agitate the substrate with an agitator 20 with a view to keeping the yeast in good contact with the wort. It is also known practice to pitch wort, under such conditions, at rates of between 5 and 20 grams of yeast per liter. At these higher pitching rates and under agitated conditions in a closed fermenter, it is not uncommon to experience an unduly large yeast cap 13 which consists essentially of carbon dioxide bubbles in substrate with entrained yeast. As indicated above, this yeast cap often gets out of control with the result that yeast and substrate are forced through the ventilating openings at the top of the fermenter and lost. This is known as purging and, to avoid its occurrence, brewers run the fermenters with a lower substrate level. This, as indicated above, reduces the capacity of a given fermenter so that the economic advantages of the shortened fermentation times that result from agitation, higher fermentation temperatures and high pitching rates tend to be reduced or lost. The yeast content of the yeast cap also represents yeast that is not "working" to ferment the substrate.

Attempts have been made to avoid the excessive yeast cap by breaking up the yeast cap with beaters attached to the agitator shaft. The area of operation of the beaters over the substrate has been large and it has been found that the yeast cap tends to form over the beaters. The attempts at effectively controlling the yeast cap in this way previously tried have not been fully successful.

In the embodiment of this invention illustrated, a pair of blades 32 are mounted on the free end of a rotatably mounted shaft 34 that is driven at a high rotational speed by means of a motor 36. The blades have a tip-to-tip diameter of about 10 inches and are rotated at a speed of about 3600 r.p.m. by motor 36. They are mounted about 5 inches below the gas vent 18 and, as they rotate, they pass through the yeast cap to degas and collapse the yeast cap at the upper part of the portion of the yeast cap defined by the area over which they rotate to prevent the yeast cap from enlarging to the top of the fermenting vessel and maintain the space between the blades and the top of the fermenting vessel substantially free of foam.

It will be noted that, as the blades 32 rotate, they, by reason of their impingement with the yeast cap, degas and collapse it. As they operate, foam from the perimeter areas of the yeast cap where the blades operate flows into the beaters and is degassed. The gas released from the broken up yeast cap escapes through the vent 18. The yeast released from the yeast cap gravitates through the yeast cap back into the substrate.

It will be noted that the blades 32 operate over the upper part of a portion of the yeast cap over a portion only of the surface of the substrate. In order to degas and collapse the yeast cap at a fast enough rate to maintain the space between the said portion of the yeast cap and the top of the fermenting vessel substantially free of foam, the blades 32 must be rotated at a relatively high rate of speed. In the embodiment illustrated, the rate of speed is 3600 r.p.m. for a blade 10 inches in diameter. The actual rotational speed is, of course, subject to variation depending upon conditions. Some yeast caps may not be as vigorous as others and a rotational speed less than 3600 r.p.m. may be sufficient to maintain the necessary area above the blades free of gas to provide for adequate ventilation of the gas. It is contemplated that speeds of between 1000 and 4000 r.p.m. would be quite satisfactory under some commonly met conditions, using a 10 inch blade.

Moreover, it will be apparent that the 10 inch blade is not a critical thing in the operation of this invention. Twenty inch blades have been tried and work satisfactorily. With a larger blade, a lower rotational speed is permissible because it will be apparent that the blade speed at the tip of the blade will increase with blade diameter. It will, howeevr, be apparent that, as the blade size increases much above 20 inches, the power requirement for rotating it at a fast rate of speed increases substantially. In practice, therefore, one will tend to use a blade less than 20 inches in diameter and preferably about 10 inches in diameter.

A blade having a 10 inch diameter will rotate over an area of about 80 square inches. It, thus, degasses and collapses the yeast cap at the upper part of the yeast cap over a portion of the surface of the substrate of about 80 square inches. A blade having a length of about 20 inches will similarly degas and collapse the yeast cap over an area of about 200 square inches.

As a specific example, the equipment described using a pair of blades having a diameter of about 10 inches operated at a speed of about 3600 r.p.m. was able to degas and collapse the yeast cap as it formed on an ale wort pitched in the fermenter illustrated at the rate of 12 grams per liter and maintained at a fermenting temperature of about 70 degrees Fahrenheit with a 25% head board space above the wort level. The wort was agitated by means of the agitator 20 and the blades were operated under these conditions to successfully degas and collapse the yeast cap in their area and maintain the space between the degassed portion of the yeast cap and the top of the fermenting vessel substantially free of foam to permit the ready ventilation of the gas. The yeast released from the yeast cap gravitated back into the wort and at no time did the yeast cap grow to such proportions that it overflowed the fermenting vessel.

This represents a substantial saving in fermenter capacity over prior known practice. Normally, one would have to provide for between 50 and 100% head board space between the substrate level and the top of the fermenter with such a yeast and yeast pitching rate if one wanted to avoid the wasteful effects of purging.

Variations are, of course, contemplated from the specific example given. The invention has application to any case where one has a problem of purging with a top fermenting yeast or with a bottom fermenting yeast. The example of fermenter operation given is not at all critical. The invention has application to any fermenter conditions that involve a purging problem. With modern fermenting techniques, higher yeast pitching rates are involved and purging is often encountered with the use of bottom fermenting yeasts commonly used in the brewing of a lager type of beer.

What I claim as my invention is:

1. In the production of an alcoholic brewery beverage wherein a yeast fermentable substrate in a fermenting vessel is pitched with a yeast, and accelerated fermenting conditions are maintained which result in the formation of excessive foam yeast cap on the top of the substrate, an improved method for controlling the size of the yeast cap in the fermenting vessel to prevent purging comprising the steps of passing rotating blades through said yeast cap at a speed of at least 1000 r.p.m. to degas and collapse the yeast cap at the upper part of the yeast cap above a portion of the surface of the substrate which is small as compared with its total surface while flowing portions of the yeast cap overlying other portions of the surface of the substrate into impingement with the rotating blades, thereby to prevent the yeast cap from enlarging to the top of the fermenting vessel and to maintain the space between the yeast cap in the vicinity of the blades and the upper extremity of said fermenting vessel substantially free of foam to permit gas released by degassing and collapsing said yeast cap to rise freely and to permit yeast entrained in said yeast cap to fall into the substrate below said yeast cap.

2. The method as claimed in claim 1 and wherein said vessel is closed at the top, including the step of venting the gas released by degassing and collapsing said yeast cap as aforesaid through a vent that overlies the yeast cap in the vicinity of the blades.

3. The method as claimed in claim 1 wherein the blades impinge upon a portion of the yeast cap above said surface of said substrate over an area of less than 80 square inches.

4. The method as claimed in claim 1 wherein the blades impinge upon a portion of the yeast cap above said surface of said substrate over an area of less than 200 square inches.

5. The method as claimed in claim 2 wherein the blades impinge upon a portion of the yeast cap above said surface of said substrate over an area of less than 80 square inches.

6. The method as claimed in claim 2 wherein the blades impinge upon a portion of the yeast cap above said surface of said substrate over an area of less than 200 square inches.

References Cited

UNITED STATES PATENTS 3,317,435   5/1967   Yamashita et al. ___ 195—107 X
3,345,179   10/1967  Polock et al. _____ 99—31

OTHER REFERENCES

Hind, H. L.: Brewing Science and Practice, Chapman & Hall Ltd., London, 1950, p. 839.

LIONEL M. SHAPIRO, Primary Examiner

D. M. NAFF, Assistant Examiner

U.S. Cl. X.R.

99—30, 35; 195—107, 144; 252—321